United States Patent [19]
Fredlund et al.

[11] Patent Number: 6,005,972
[45] Date of Patent: Dec. 21, 1999

[54] METHOD FOR ADDING PERSONALIZED TEXT AND/OR GRAPHICS TO COMPOSITE DIGITAL IMAGE PRODUCTS

[75] Inventors: John R Fredlund; Ronald S. Cok; Frank Pincelli, all of Rochester, N.Y.

[73] Assignee: Eastman Kodak Company, Rochester, N.Y.

[21] Appl. No.: 08/752,701

[22] Filed: Nov. 19, 1996

[51] Int. Cl.[6] .................................................. H04N 1/387
[52] U.S. Cl. ........................ 382/176; 358/452; 358/464; 358/537
[58] Field of Search ..................................... 382/176, 284, 382/291, 295; 358/462, 464, 450, 452, 453, 537, 539, 540; 345/435, 144, 470; H04N 1/387

[56] References Cited

U.S. PATENT DOCUMENTS

| | | | |
|---|---|---|---|
| 5,459,586 | 10/1995 | Nagasato et al. | 358/450 |
| 5,459,819 | 10/1995 | Watkins et al. | 395/117 |
| 5,499,110 | 3/1996 | Hosogai | 358/540 |
| 5,553,277 | 9/1996 | Hirano et al. | 358/462 |
| 5,592,305 | 1/1997 | Iwadate et al. | 358/462 |
| 5,680,223 | 10/1997 | Cooper et al. | 358/468 |
| 5,689,342 | 11/1997 | Nakatsuka | 358/462 |

*Primary Examiner*—Kim Yen Vu
*Attorney, Agent, or Firm*—Frank Pincelli

[57] ABSTRACT

A method and system for combining a prestored digital image with personalized text and/or graphics including a media for use therewith. The media is constructed so that the personalized text or graphics placed thereon can be automatically read therefrom using a digital scanner and computer.

15 Claims, 12 Drawing Sheets

110

*Happy Birthday*

*Katie*

FIG. 10

METHOD FOR ADDING PERSONALIZED TEXT AND/OR GRAPHICS TO COMPOSITE DIGITAL IMAGE PRODUCTS

FIELD OF THE INVENTION

The present invention is directed to a system and method for producing customized images wherein personalized text and/or graphics may be added to the customized image in a quick, easy and convenient manner.

BACKGROUND OF THE INVENTION

It is known from U.S. Pat. No. 5,459,819 to combine at least two different digital images so as to form a single merged digital image. It is also known that text may be added to the merged digital image by means of key strokes input to the computer system, which is converted into bitmaps and merged with the composite image. It is also known that the text can come in a variety of different fonts and sizes. However, this is nothing more than typical fonts available in preprogrammed computer systems. There is no ability to provide customized text and/or graphics which has been personalized. For example, there is no easy or convenient way whereby handwritten text or personalized graphics can be added to a merged digital image.

During the merging of the image, an operator is often required to assure that an appropriate quality image is produced. It is extremely important in such systems in order to keep down the cost, that any time spent by the operator is minimized. Thus, it is not practical or economical to have an operator do complex digital editing for producing of the merged digital image. Thus, the addition of text and/or specialized graphics has been limited simply to keystroking of information into the computer, whereby the text is reproduced on the digital image by the computer. However, this restricts the amount of personalization in individual text and/or graphics that may be added to the composite image in a quick, easy and economical way. Additionally, there is no means for rendering of characters not present on the computer.

Applicants have invented an improved system and method whereby a high degree of personalization can be obtained by allowing the addition of personalized text and/or graphics to be quickly incorporated into the digital merged image. This is of particular importance in regions of the world, such as Japan and China, where the written language includes a large number of different characters, and wherein text/image rendering systems are often not equipped for handling large numbers of characters. The present invention allows inclusion of images and text, which previously has not been easily accomplished.

SUMMARY OF THE INVENTION

In accordance with one aspect of the present invention there is provided a method of combining a prestored digital image with personalized text and/or graphics. The method comprising the steps of:

providing a prestored digital image having a predetermined location for receiving personalized text and/or graphics;

providing a media on which text and/or personalized graphics may be provided;

placing on the media the personalized text and/or graphics;

scanning the media, the media being constructed such that the personalized text or graphics is automatically distinguished and captured from the media; and combining the personalized text or graphics with the prestored image at the location.

In accordance with another aspect of the present invention there is provided a system for combining a prestored digital image with personalized text and/or graphics. The system comprising:

a media upon which personalized text or graphics may be placed;

means for scanning the media and for automatically separating the personalized text or graphics written thereon from the media; and means for digitally combining the personalized text and/or graphics with a prestored image so as to form a merged digital image.

In yet another aspect of the present invention there is provided a media having a predetermined location for receiving a personalized text and/or graphics by a writing instrument. The writing media is constructed such that when the text and/or graphics is placed thereon by the writing instrument, the text and/or graphics can be easily differentiated by a computer analyzing the digital data obtained by scanning the media.

DESCRIPTION OF THE DRAWINGS

In the detailed description of the preferred embodiment of the invention as presented below, reference is made to the accompanied drawings, in which:

FIG. 10 illustrates the merging of the two personalized texts of FIG. 9;

DETAILED DESCRIPTION OF THE INVENTION

Figure 1:
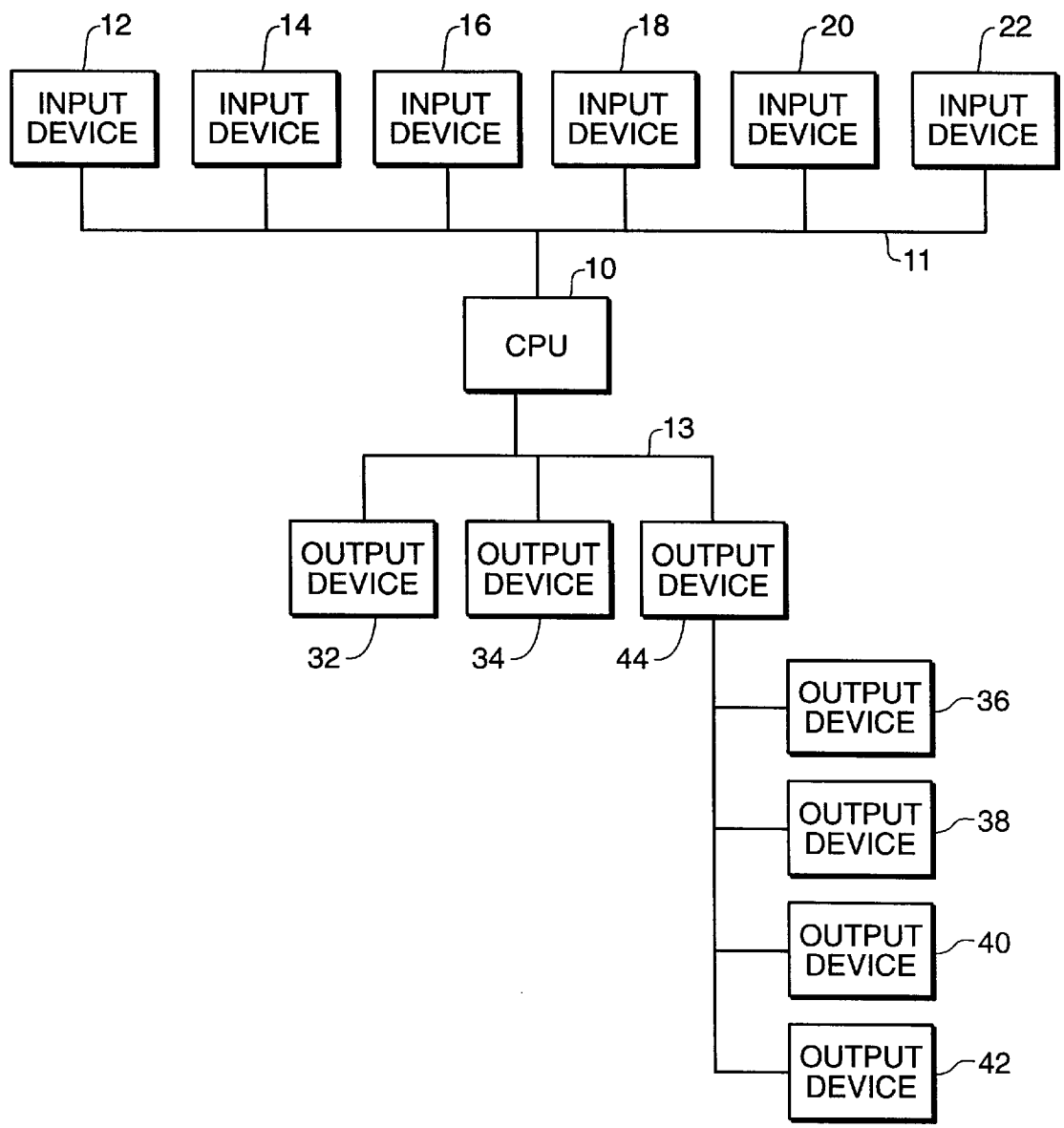
FIG. 1 is a schematic block diagram of a system made in accordance with the present invention.

Referring to FIG. 1, there is illustrated in block diagram form, a system for producing customized images and imprinting these customized images onto a variety of different formats. In particular, the system includes a central processing unit (CPU) 10 which can take the form of any appropriate computer. In the particular embodiment illustrated, the central processing unit 10 comprises an Apple Macintosh Computer which is used to control the various input and output devices. A plurality of input devices 12,14,16,18,20,22 are provided for generating an image in a digital format. In particular, first input device 12 comprises a scanner used to scan photographic negatives or slides, both color and monochrome. In the particular embodiment illustrated, the input device 12 comprises a Rapid Film Scanner 2035, made by the Eastman Kodak Company. The input device 12 scans the film and produces a digital output which is forwarded onto the central processing unit 10 by an appropriate data link system 11 for storage in memory and further manipulation. Likewise, input device 14 is provided for scanning of photographic pictures, printed or drawn, both color and/or monochrome, and producing a digitized signal which is representing the image scanned. The Coloredge Printer, sold by the Eastman Kodak Company, has a scanner built therein which is capable of scanning photographic pictures, or any type printed material, and providing the appropriate digital signal for the computer 10. The second input device 14 is appropriately connected to the CPU 10 such that the CPU 10 may appropriately receive and manipulate the information obtained therefrom. Likewise, input devices 16,18,20,22 are provided for obtaining digital signals representative of an image from various sources. In particular, input device 16 is a video camera designed to obtain images, and input device 18 comprises a CD (compact disc) reader for reading digitally stored information on a compact disc. Input device 20 comprises an electronic camera such as the DCS 200 Digital Camera, produced by the Eastman Kodak Company. Input device 22 may be any other input device which is capable of providing a digital signal representative of an image to the CPU, for example, video tape and video laser disc.

The CPU 10 is also connected to a variety of output devices 32,34,36,38,40,42. These output devices are all appropriately connected to the central processing unit 10 by an appropriate data link system 13 as is well known in the prior art. For example, but not by way of limitation, by an Ethernet data link system. The output device 32, for instance, comprises an electrophotographic printer such as the Kodak Image Magic Heavy Stock Printer, sold by the Eastman Kodak Company, which takes the digital image and transfers the image onto media which can then be used to produce transfers for use on garments. The output device 34, in the embodiment illustrated, is a cathode-ray tube printer (CRT), in particular, the PCD 600 Printer, produced by the Eastman Kodak Company, which takes an image that is displayed on a cathode-ray tube and focuses it onto a photographic paper. Also provided is a thermal printer 36 for printing images onto thermal media. An example of a suitable thermal printer is the XLS 8600 Digital Thermal Color Printer, sold by the Eastman Kodak Company. In particular, printer 38 can be a thermal printer for providing transfers for use on T-shirts, whereas thermal printer 40 can be used for providing transfers for placement on mugs. The last output device 42 illustrated is an inkjet printer which can be used to imprint the merged image on greeting cards and the like. Various other devices may be provided for transferring onto various other formats such as garments, mugs, posters, banners, life-size cut-outs, holographic and 3-D imaging, balloons, pens, and pencils.

Figure 2:
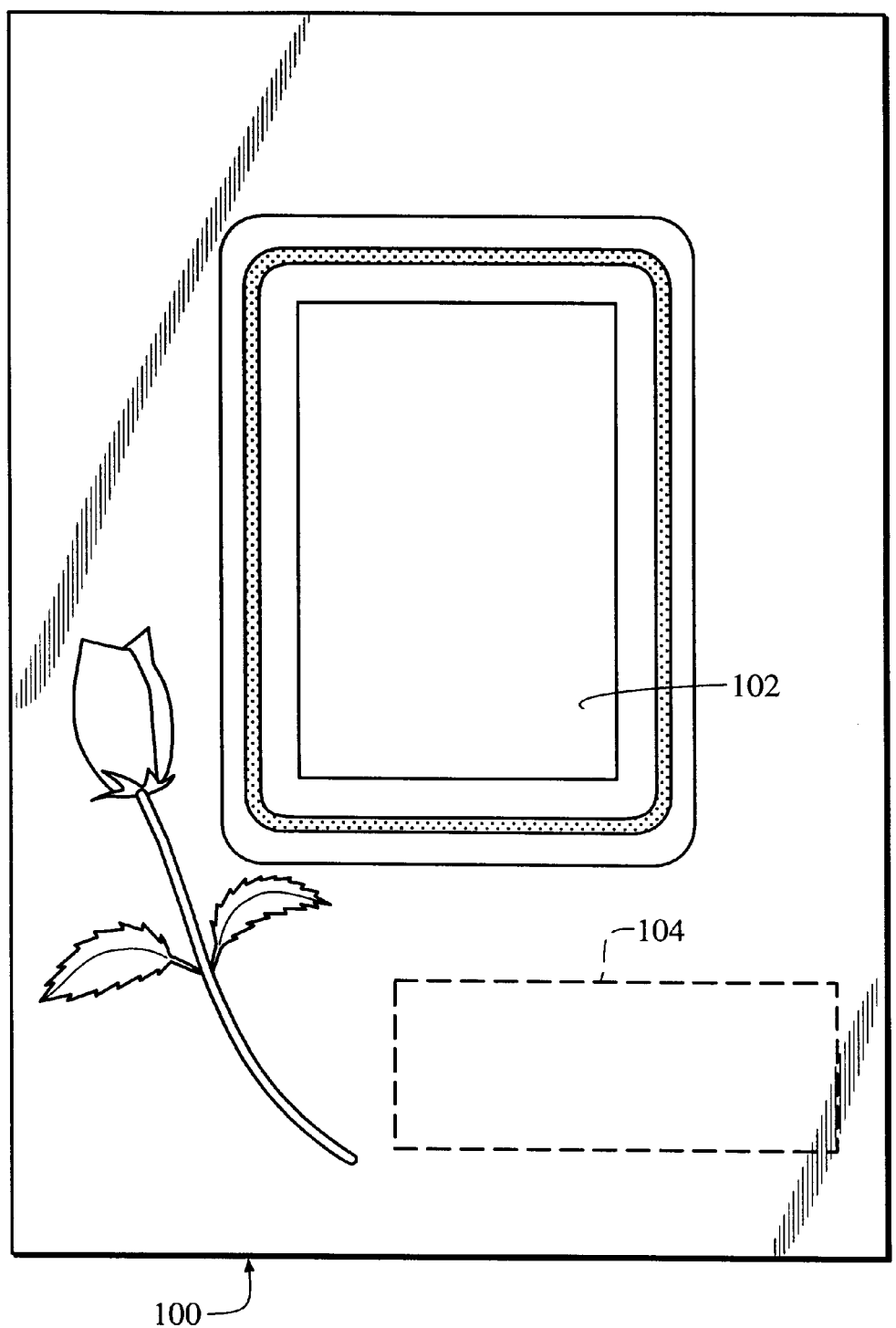
FIG. 2 illustrates an example of a prestored digital image having a single location for receiving a customer-generated image and a single location for receiving personalized text or graphics.
Figure 3:
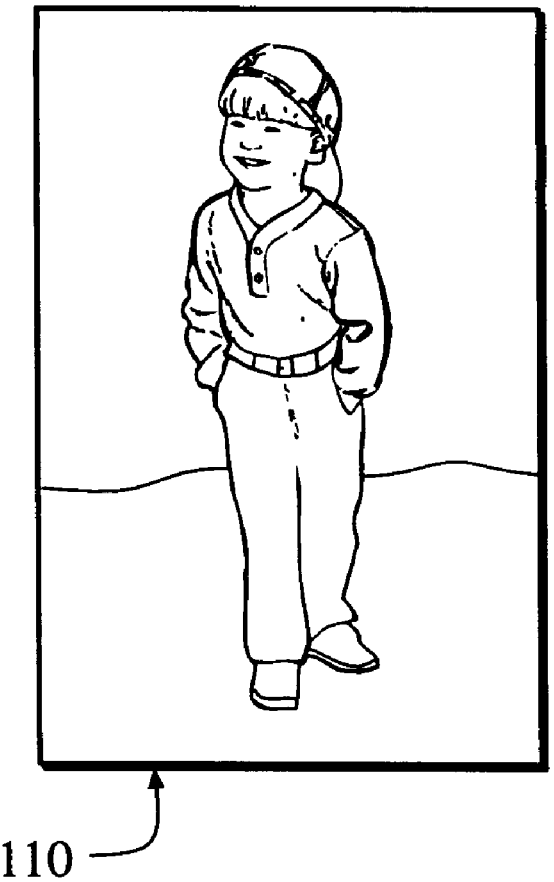
FIG. 3 is a customer-generated image for placement in the prestored image of FIG. 2.

Referring to FIG. 2, there is illustrated a digital prestored image 100 that has been stored in the memory of CPU 10. The prestored image 100 has at least one location 102, as indicated by a dashed line, where a selected customer-generated digital image 110, as shown in FIG. 3, can be placed. In the embodiment illustrated, the prestored digital image also has a location 104 where personalized text and/or graphics may be placed. The text or graphics may be placed directly on top of the prestored image 100 or in a clean reserved area designed to specifically illustrate the text and/or graphics.

The customer-generated digital image 100 may be obtained from a variety of sources, for example, the digital image may be obtained by any of the input devices 12,14, 16,18,20,22.

Figure 4:
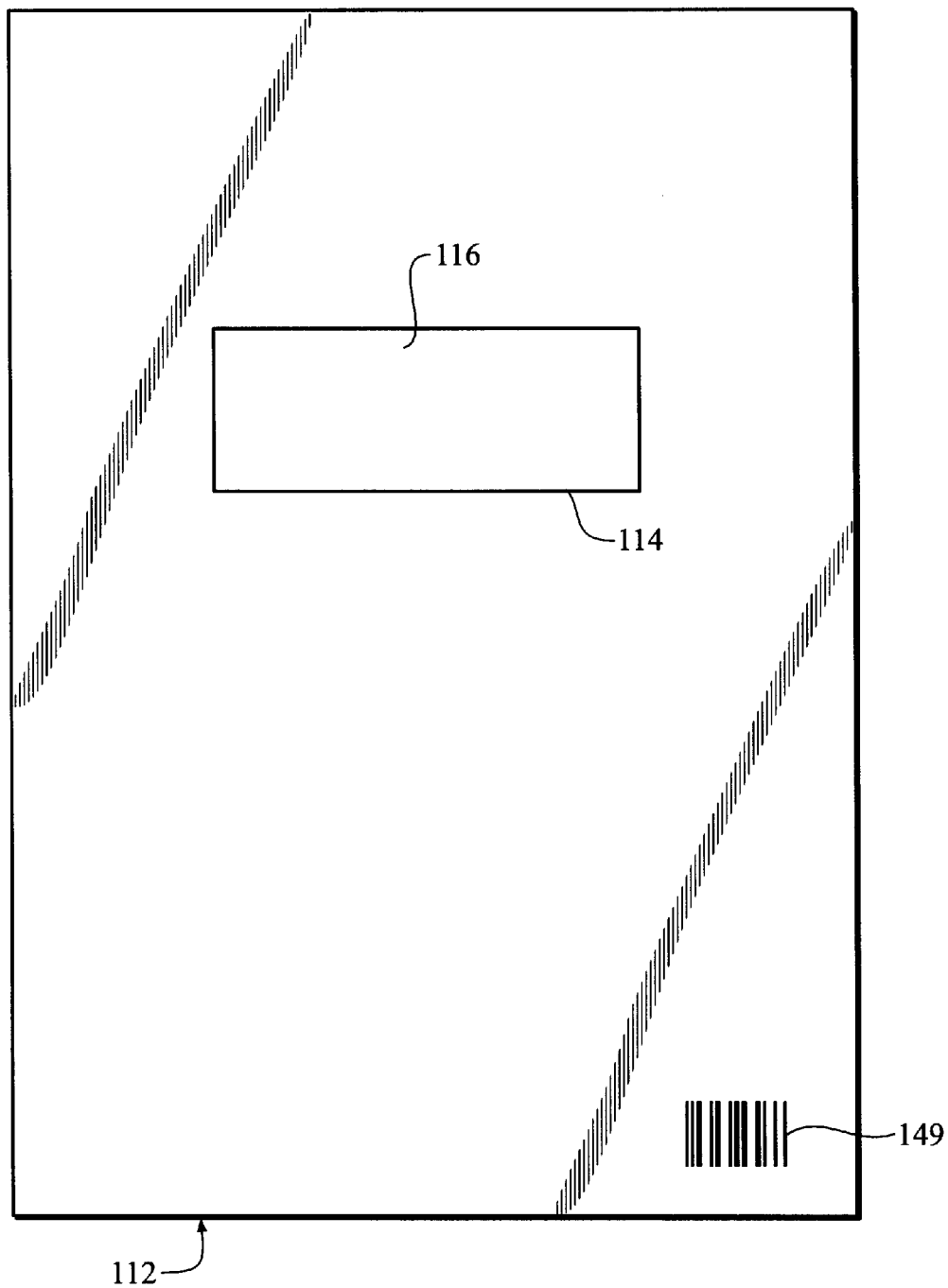
FIG. 4 is a plan view of a media which can be used to receive personalized text or graphics in accordance with the present invention.
Figure 5:
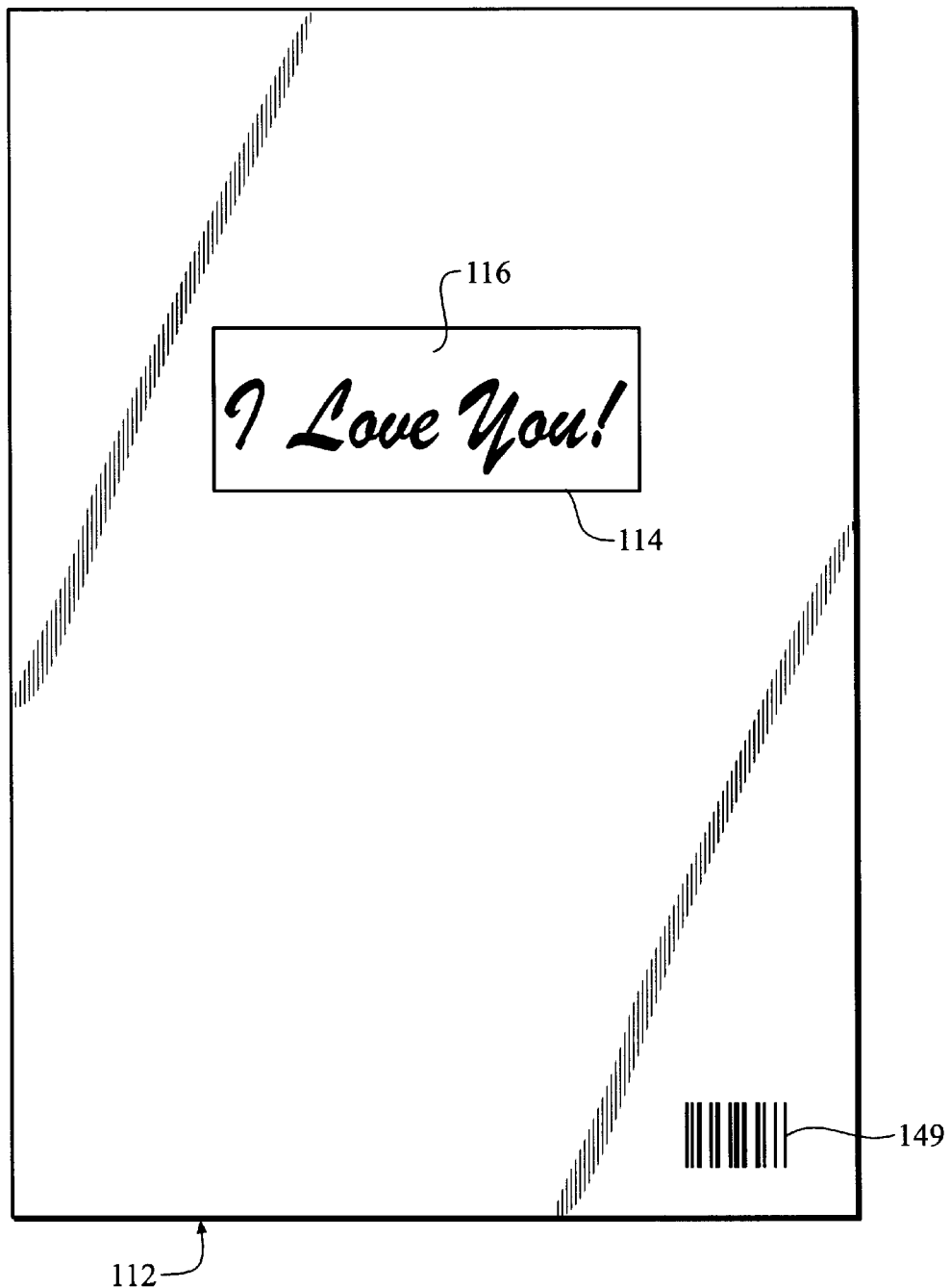
FIG. 5 is a view similar to FIG. 4 wherein personalized text has been added to the media.
Figure 6:
FIG. 6 is a histogram of the scanned media of FIG. 5.

Referring to FIG. 4, there is illustrated a media 112 which can be used to obtain personalized text and/or graphics in accordance with the present invention. In the particular embodiment illustrated, the media 112 comprises a sheet of paper capable of receiving a marking by typical writing instruments, such as pens, pencils, etc. In the embodiment illustrated, the media 112 is provided with an outline border 114 which defines a writing area 116 wherein personalized text or graphics may be provided by the customer. For example, as illustrated in FIG. 5, the statement "I Love You" has been handwritten on area 116 with an appropriate writing instrument. The media 112 is constructed such that the personalized text and/or graphics can be easily and quickly differentiated from the media. In the particular embodiment illustrated, this is accomplished by insuring that the color and density of the handwritten text differs significantly from that of the media on which the text or graphics is written. In the particular embodiment illustrated, the media 112 is colored white or a color very similar thereto. The marking implement used by the customer to provide the text and/or graphics would preferably be a dark ink pen or lead, for example, blue or black ink pen, or a dark lead pencil. When the media 112 is scanned by an appropriate digital scanner, such as a CCD scanner whereby the difference between the background of the media 112 and the text can be obtained and translated into the histogram illustrated in FIG. 6. In the embodiment illustrated the scanner used was a UMAX scanner. The peaks 115 on the right of FIG. 6 indicate the dark image area formed by the pen, pencil, or other marking instrument, and the remaining area 120 of the histogram indicate the areas of the media which have a color not desired. The computer would then simply only take that portion of the scanned image represented by the peaks 115. This part of the scanned image is captured and placed into the prestored image at location 104. In this way, only the text and/or graphic placed on the media is obtained.

In the preferred embodiment illustrated, an outlying border 114 is provided having substantially the same size as location 104 in which the personalized text is to be placed. This is done in order to provide the customer with a more realistic representation of the area in which the personalized text or graphic is to be placed. However, the size of the outlying border may be larger, or any other size desired, and adjusted to the size of the location in which it is to be placed or even omitted if desired. Once having obtained the personalized text or graphics, the CPU 10 is preferably programmed to automatically resize, center, justify, or place the image such that the text and/or graphic is placed in the prestored image to obtain the desired visual effect.

Figure 7:
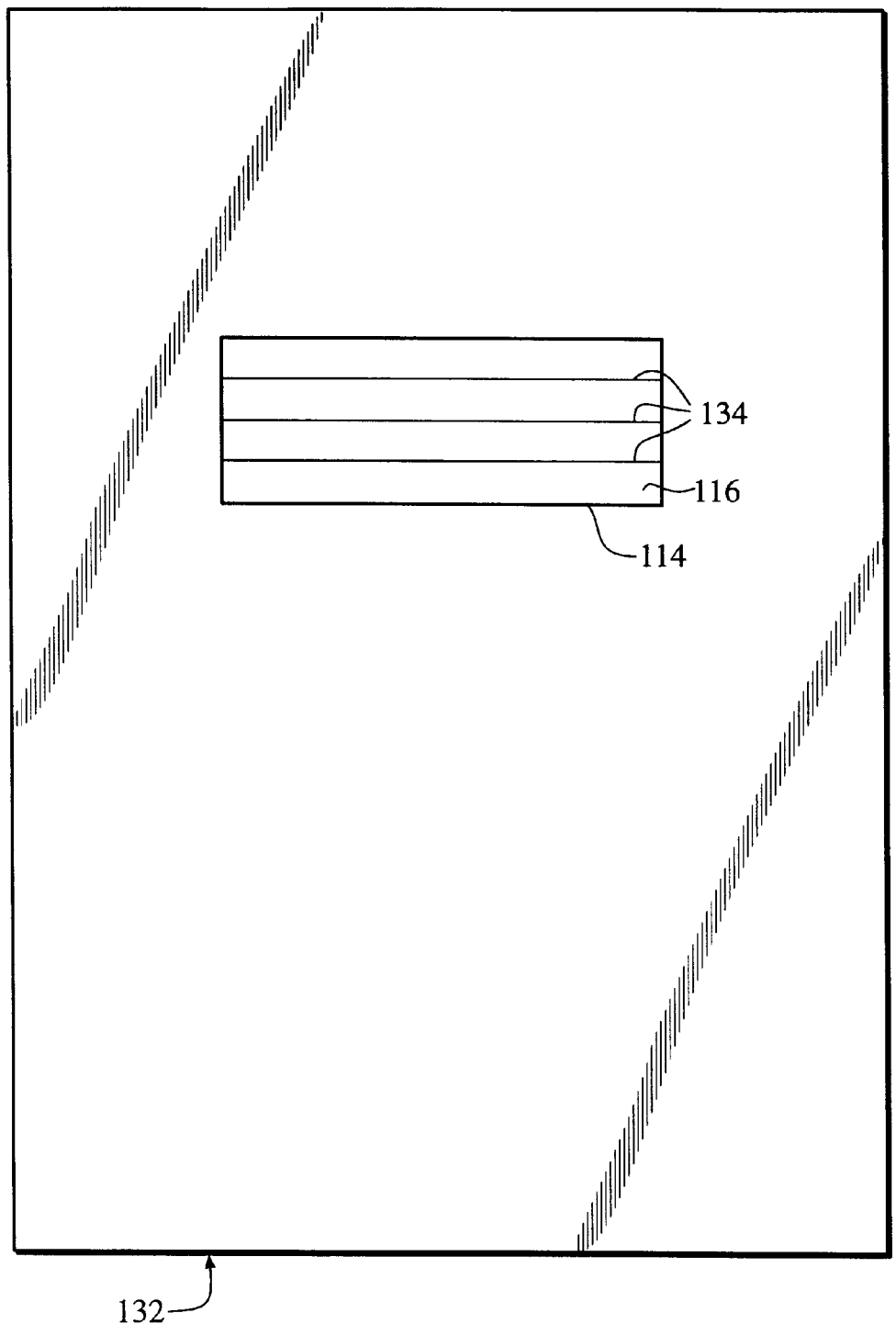
FIG. 7 is view similar to FIG. 4 illustrating a modified media made in accordance with the present invention.

It should be noted that the outlying text border 114 may be of any desired color which can screened out, for example, blue or yellow, so that the text or graphic can be separated from the border 114. Referring to FIG. 7, there is illustrated a modified media 132, made in accordance with the present invention. Media 132 is similar to media 112, except that lines 134 are additionally provided for assisting the customer in writing a message thereon. Lines 134 preferably have a color which can also be separated from the text and/or graphic, for example, light blue or yellow, in the same manner as previously discussed with the outlying border 114.

Figure 8:
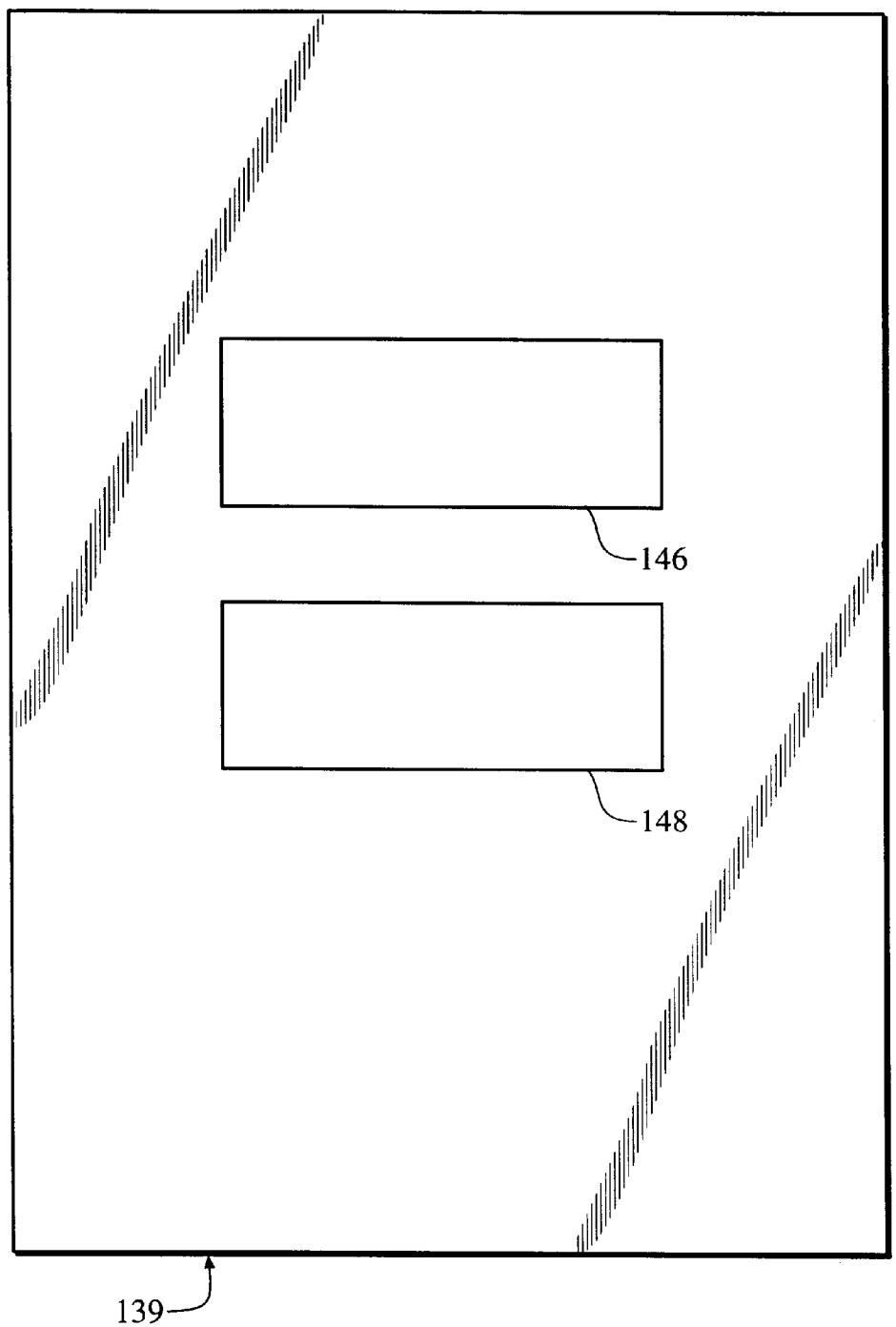
FIG. 8 is a view similar to FIG. 4 illustrating yet another media made in accordance with the present invention.
Figure 9:
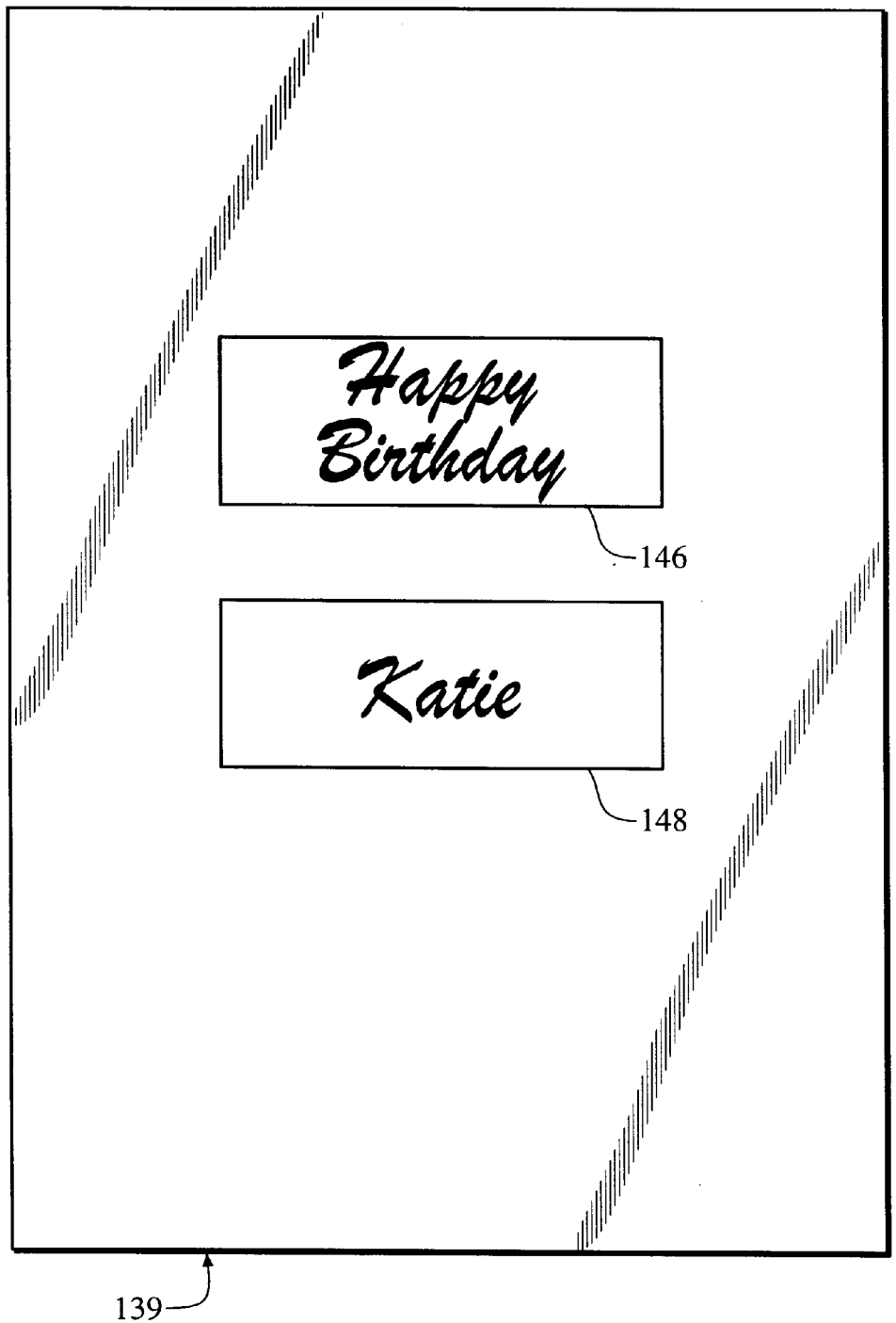
FIG. 9 is similar to FIG. 8 illustrating personalized text placed on the media.

In the embodiment illustrated in FIG. 4, a single location is provided on the media in which the text and/or graphic may be placed. The present invention is not so limited. For example, referring to FIG. 8, there is illustrated media 139 having two enclosed boxes 146,148 defining two separate areas in which different messages may be placed which can be successively placed and centered onto the prestored image at a single location or at two separate locations. For example, referring to FIG. 9, there is illustrated the word "Happy Birthday," placed in box 146 and the word "Katie" in box 148. When this is scanned and placed in the prestored image, it would show up as "Happy Birthday, Katie" as a continuous written text as illustrated by FIG. 10. Additionally, the computer can be programmed so that the text in each area is appropriately sized in relationship with each other automatically such that the combined text will have a predetermined appearance. For example, if desired, the computer may be programmed so that one of the texts is larger or has a more dominant feature as illustrated in FIG. 10. For example, one may have a more bold font. This relationship can be preprogrammed or selected by the customer.

It is also possible to provide additional instructions to the CPU which can be automatically implemented. For example, as illustrated in FIG. 5, a instruction barcode 149 is provided on the bottom of the media which can be read by the scanner and thus provide an instructional code to the CPU. For example, this instructional code can provide the identification of the particular prestored image in which the text and/or graphic is to be placed, identification of the particular media being used, and the number and type of locations to be scanned on the media. The barcode 149 can also provide specific instruction or modifications to be made to the prestored image or to the text and/or graphic. Such instructions could include, but are not limited to, identifying the color of the text or graphics or some special font or treatment (e.g., line thickness, character color, or opacity) in which the text is to be printed. It is, of course, understood that any desired instructions or information may be passed onto the CPU 10.

Figure 11:
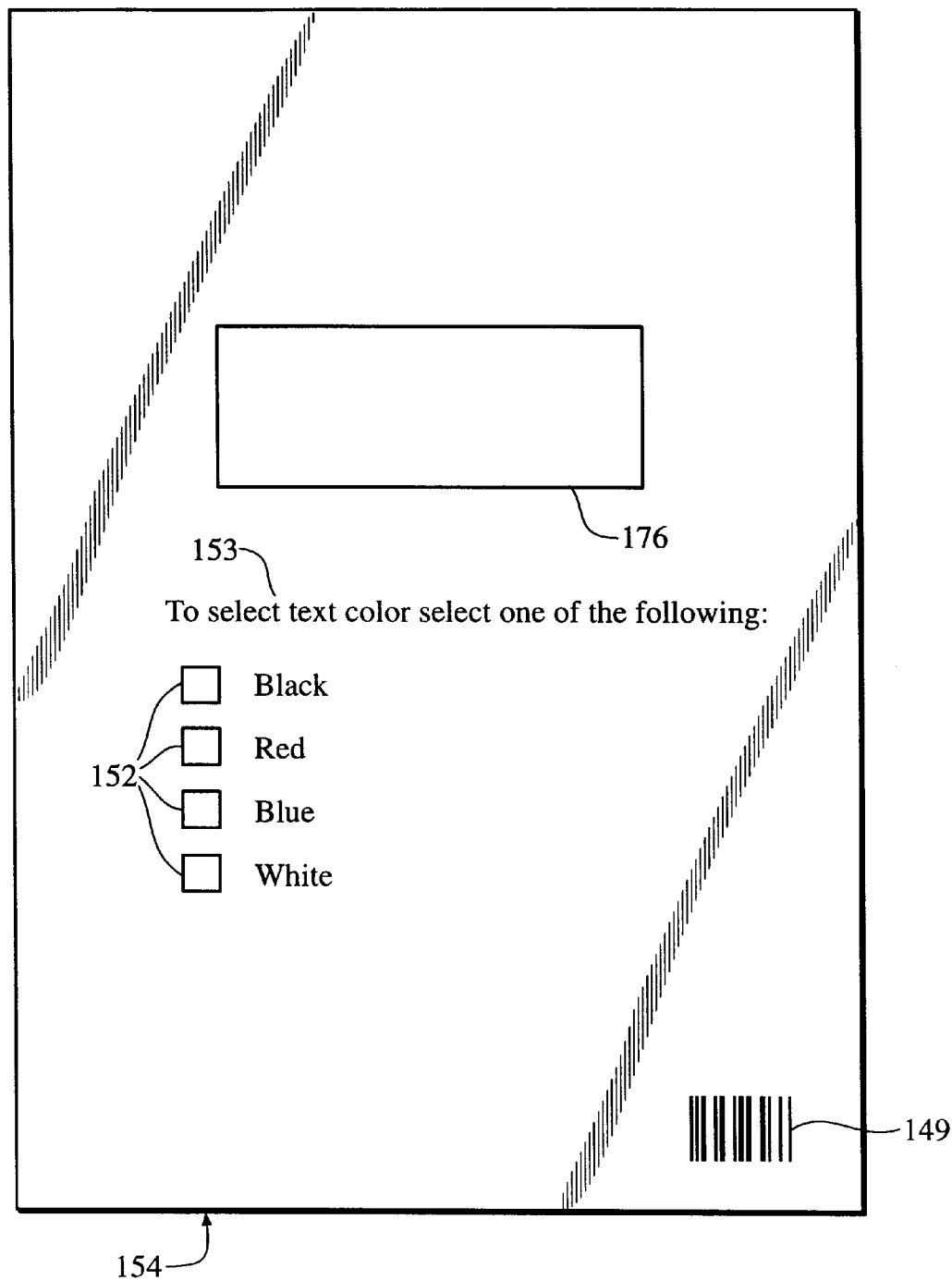
FIG. 11 is a plan view of yet another modified media made in accordance with the present invention.

As an alternative to the barcode 149, instructional boxes 152, as illustrated in FIG. 11, may be provided on media 154 which can be selected by the customer by appropriately darkening the desired box. Since only the text and/or graphic within writing area 116 is be scanned for insertion within the prestored image, instructional information for the user may be provided directly on the media 112. As illustrated, a plurality of color selection boxes 152, along with instructions 153, are provided. The customer or user would simply mark the appropriate box 152. When the scanner scans the media 112, the scanned information will inform the CPU that that text or image should be in that particular color. If a barcode 149 is also provided, this will be scanned at the same time which will also advise the CPU 10 with any other instructional information. The text and/or graphic is also be read at the same time.

Figure 12:
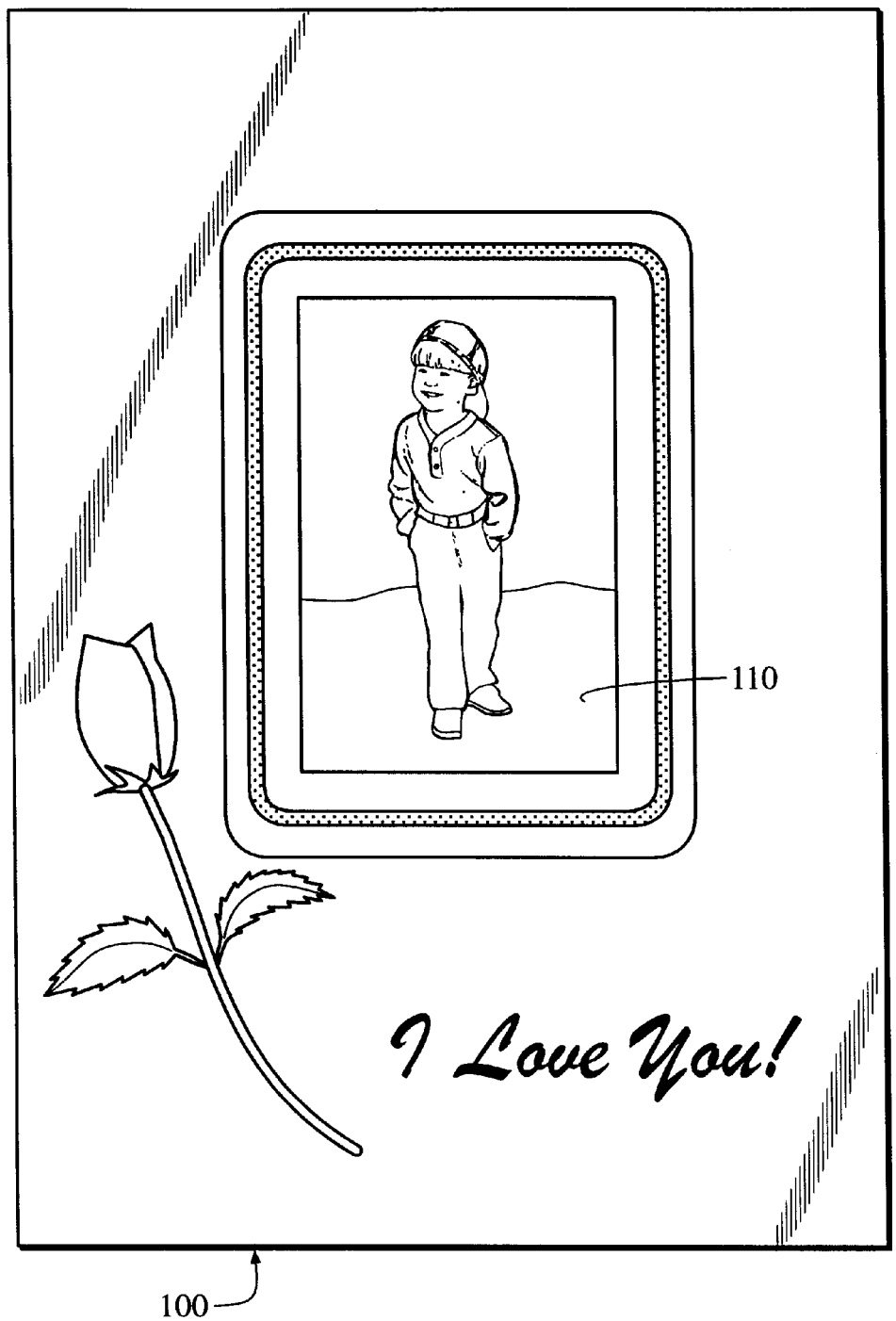
FIG. 12 is plan view of the prestored image of FIG. 2 merged with the image of FIG. 3 and the personalized text of FIG. 5.

Referring to FIG. 12, there is illustrated a prestored image 100 which incorporates a customer-generated digital image 110 and the personalized text or graphic of FIG. 5. It can be seen that any type text and/or graphics may be placed in the area 116 which can easily, quickly and automatically incorporated into the prestored image.

In order to more clearly understand the present invention, a brief description of its operation will now be discussed. Initially, a customer selects a prestored image 100 in which a customer-generated digital image is to be placed. The customer provides a source of the image, i.e., a print or a color negative, which is scanned by one of the appropriate input devices and incorporated and appropriately converted to the appropriate digital data for incorporation into the prestored digital image. Thereafter, if the customer selects a prestored digital image which requires, or an election which allows for, the addition of personalized text and/or graphics, a media 112 is provided to the customer. The customer, at his or her own leisure, can provide the personalized text in the appropriate location. At this time any instructional boxes provided on the media also selected. Appropriate instructions as to the use may be provided on the media 112 or on a separate sheet. Once the appropriate text and/or graphic has been entered by the customer and any appropriate instructional codes selected, the media is given to the operator whereby it is scanned by the appropriate input device. This information is passed onto the CPU 10. Any barcode instructional code is automatically interpreted by the CPU 10 and the text or graphic is obtained. The CPU then takes the personalized text and/or graphic, the customer-generated image and the prestored image and merges them to provide the prestored digital image as illustrated by FIG. 12. The merged image is then sent to the appropriate output device where it is printed on the appropriate media, for example, a silver halide photographic paper.

Thus, it can be seen that a quick and efficient method is provided whereby personalized text can be added to a prestored image which easy and economical and requires very little intervention control by the operator and provides a product which is aesthetically pleasing.

It is to be understood that various other changes and modifications may be made without departing from the scope of the present invention, the present invention being defined by the following claims.

Parts List

101 . . . central processing unit (cpu)
11,13 . . . data link system
12,14,16,18,20,22 . . . input devices
13 . . . data link system
32,34,36,38,40,42 . . . output devices
36 . . . thermal printer
40 . . . thermal printer
100 . . . digital prestored image
102,104 . . . location
110 . . . digital image
112 . . . media
114 . . . border
115 . . . peaks
116 . . . area
120 . . . area
132 . . . media
134. . . . lines
139 . . . media
146,148 . . . boxes
149 . . . instruction barcode
152 . . . boxes
153 . . . instructions
154 . . . media

We claim:

1. A method of combining a prestored digital image with personalized text and/or graphics, said method comprising the steps of:

providing a prestored digital image having a predetermined location for receiving personalized text and/or graphics;

providing a media on which text and/or personalized graphics may be provided;

placing on this media personalized text and/or graphics;

scanning said media, said media being constructed such that said personalized text or graphics is automatically distinguished and captured from the background of said media; and combining said personalized text or graphics with said prestored image at said predetermined location.

2. A method according to claim 1 wherein instructions are read from said media for controlling manipulation of said personalized text and/or graphics.

3. A method according to claim 1 wherein said personalized text or graphic is automatically sized, centered, justified or otherwise located with respect to said predetermined location.

4. A system for combining a prestored digital image with personalized text and/or graphics, comprising:

a media upon which personalized text or graphics may be placed;

means for scanning said media and for automatically separating said personalized text or graphics written thereon from the background of said media, said media is provided with a machine readable code, said code representing an instructional code for said printing of said text and/or graphics; and means for digitally combining said personalized text and/or graphics with a prestored image so as to form a merged digital image.

5. A system according to claim 4 wherein said code is a machine readable article.

6. A method of combining a prestored digital image with personalized text and/or graphics, said method comprising the steps of:

providing a prestored digital image having a predetermined location for receiving personalized text and/or graphics;

providing a media on which text and/or personalized graphics may be provided;

placing on this media personalized text and/or graphics;

scanning said media, said media being constructed such that said personalized text or graphics is automatically distinguished and captured from said media, said means for distinguishing said personalized text and graphics from said media comprises said media being made of color, which be easily distinguished from said personalized text or graphics of a second color; and combining said personalized text or graphics with said prestored image at said predetermined location.

7. A media having a predetermined location for receiving a personalized text and/or graphics by a writing instrument, said media being constructed such that when said text and/or graphics is placed thereon by said writing instrument said text and/or graphics can be easily differentiated by a computer analyzing the digital data obtained by scanning said media, said media have means for automatically providing printing instructions said media having a color that can be easily distinguished from the color of said text and/or graphics made by said writing instrument.

8. A media according to claim 7 wherein said means for providing printing instructions comprises at least one area provided on said media that can be designated by the user and can be read by a scanner, said area being indicative of an instructional code for printing said text and/or graphics.

9. A media according to claim 8 wherein written instructions are placed on said media for using said at least one area.

10. A media according to claim 7 wherein said means for providing printing instructions comprises a machine readable code, said code representing an instructional code for printing of said text and/or graphics.

11. A media according to claim 10 where in said code is a machine readable barcode.

12. A system for combining a prestored digital image with personalized text and/or graphics, comprising:

a media upon which personalized text or graphics may be placed;

means for scanning said media and for separating said personalized text or graphics written thereon from said media, said media having a color that can be easily distinguished from the color of said text and/or graphics written thereon; and means for digitally combining said personalized text and/or graphics with a prestored image so as to form a merged digital image.

13. The system according to claim 12 further comprising a printer for printing said merged digital combining image.

14. A system according to claim 12 wherein at least one area is provided on said media that can be designated by the user and can be read by a scanner, said area being indicative of an instructional code for printing said text and/or graphics.

15. A system according to claim 14 wherein written instructions are placed on said media for using said at least one area.

* * * * *